United States Patent
Heinrich et al.

(10) Patent No.: US 11,494,280 B2
(45) Date of Patent: Nov. 8, 2022

(54) CONSUMPTION MONITORING DEVICE AND RELATED METHOD FOR NETWORKED RESOURCES

(71) Applicant: HEWLETT PACKARD ENTERPRISE DEVELOPMENT LP, Houston, TX (US)

(72) Inventors: David F. Heinrich, Tomball, TX (US); Scott Faasse, Tomball, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 181 days.

(21) Appl. No.: 16/844,443

(22) Filed: Apr. 9, 2020

(65) Prior Publication Data
US 2021/0318941 A1    Oct. 14, 2021

(51) Int. Cl.
| | | |
|---|---|---|
| *G06Q 30/04* | (2012.01) | |
| *G06F 11/30* | (2006.01) | |
| *G06F 11/34* | (2006.01) | |
| *G06F 1/3206* | (2019.01) | |
| *G06F 9/50* | (2006.01) | |

(52) U.S. Cl.
CPC ........ *G06F 11/3006* (2013.01); *G06F 1/3206* (2013.01); *G06F 9/5016* (2013.01); *G06F 11/3051* (2013.01); *G06F 11/3495* (2013.01); *G06Q 30/04* (2013.01)

(58) Field of Classification Search
CPC .. G06F 11/3006; G06F 1/3206; G06F 9/5016; G06F 11/3051; G06F 11/3495; G06Q 30/04
See application file for complete search history.

(56) References Cited

U.S. PATENT DOCUMENTS

| | | | | |
|---|---|---|---|---|
| 2003/0046396 A1* | 3/2003 | Richter | ................... | G06F 9/505 709/226 |
| 2008/0244260 A1* | 10/2008 | Feldman | ................. | H04L 12/66 713/153 |
| 2012/0303322 A1 | 11/2012 | Rego et al. | | |

(Continued)

FOREIGN PATENT DOCUMENTS

| | | |
|---|---|---|
| CN | 107168853 A | 9/2017 |
| JP | 2004-054932 A | 2/2004 |
| WO | 2020/010890 A1 | 1/2020 |

OTHER PUBLICATIONS

Libri et al., "DiG: Enabling Out-of-Band Scalable High-Resolution Monitoring for Data-Center Analytics, Automation and Control (Extended)", Jul. 17, 2019, pp. 1-12.

*Primary Examiner* — Michael A Keller
(74) *Attorney, Agent, or Firm* — Hewlett Packard Enterprise Patent Department

(57) ABSTRACT

Examples described herein relate to consumption monitoring device and method for changing a client for its use of a networked resource. The consumption monitoring device may receive information regarding an out-of-band (OOB) performance parameter from a manageability controller corresponding to a networked resource subscribed by the client. The consumption monitoring device may determine a resource consumption metric corresponding to the networked resource for the client based at least on the information regarding the OOB performance parameter received from the manageability controller. The client may be charged based on the resource consumption metric.

20 Claims, 5 Drawing Sheets

(56) References Cited

U.S. PATENT DOCUMENTS

| | | | |
|---|---|---|---|
| 2014/0068272 A1* | 3/2014 | Savtchenko | H04L 9/3226 |
| | | | 713/185 |
| 2018/0129503 A1* | 5/2018 | Narayan | H03K 19/0175 |
| 2018/0253288 A1* | 9/2018 | Raman | G06F 11/3062 |

* cited by examiner

CONSUMPTION MONITORING DEVICE AND RELATED METHOD FOR NETWORKED RESOURCES

BACKGROUND

Cloud infrastructure including cloud resources and cloud services may be used as an alternative to or in addition to owning individual IT infrastructure components, resources, and services. Customers such as individuals and/or enterprises may subscribe for the cloud resources and/or the cloud services from several cloud platforms available in the market. The customers of the cloud resources and/or the cloud services may be charged by the cloud platforms based at least on a usage of the cloud resources and/or the cloud services.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
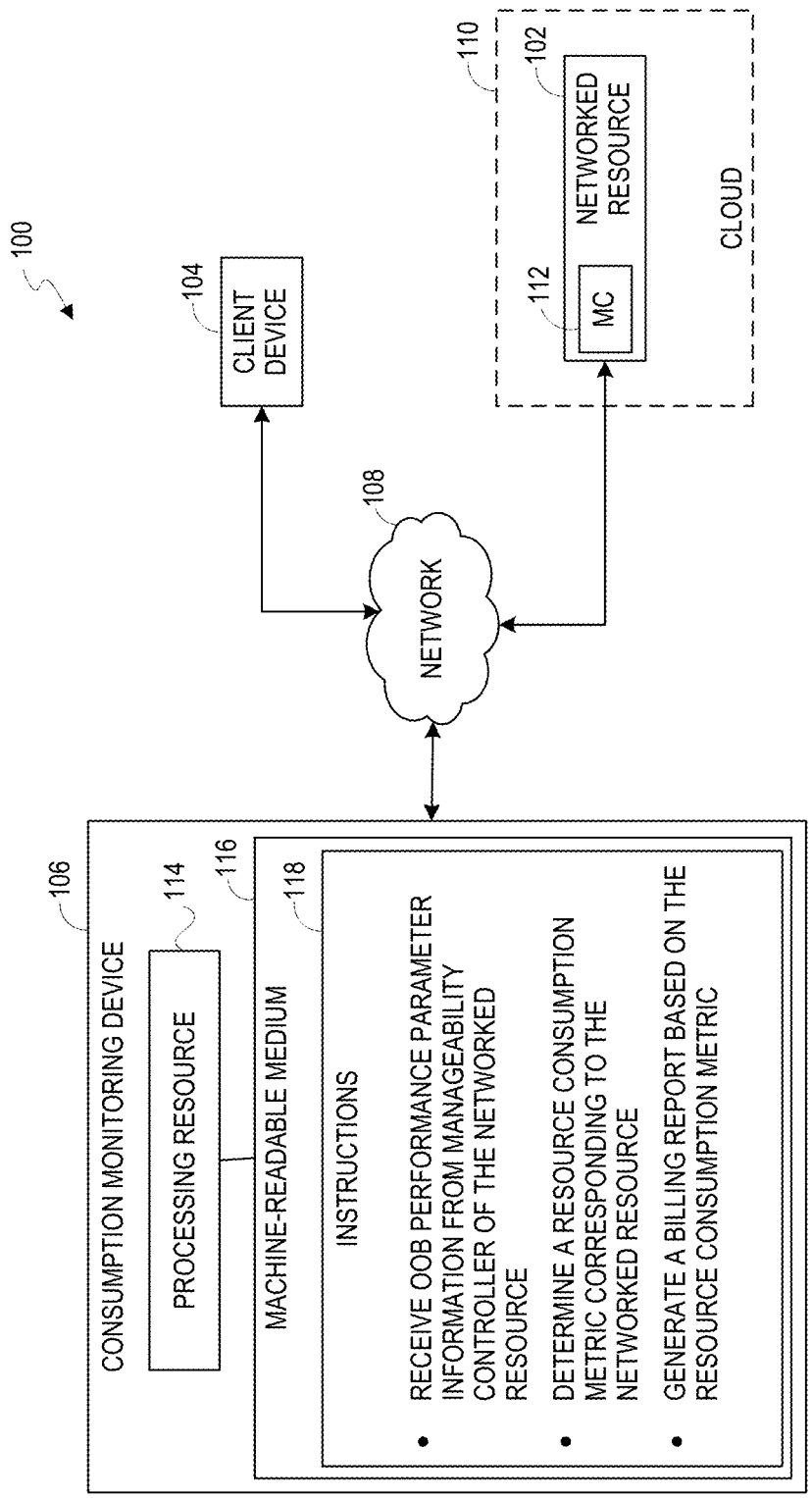
FIG. 1 is a system including a consumption monitoring device coupled to a networked resource, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. As used herein, the term "includes" means includes but not limited to, the term "including" means including but not limited to. The term "based on" means based at least in part on.

Cloud platforms may offer cloud infrastructure including cloud resources and cloud services to customers (e.g., individuals and/or enterprises) for subscription. Customers may subscribe for various cloud resources and/or the cloud services from several cloud platforms available in the market. The customers of the cloud resources and/or the cloud services may be charged by the cloud platforms based at least on a usage of the cloud resources and/or the cloud services.

Unfortunately, there exists a wide disparity in both metering methods as well as prices of the cloud resources and/or the cloud services among different cloud platforms. Typically, the cloud platforms focus on a parameter such as a time duration for which the cloud resources and/or the cloud services have been used by the customers used to determine a charge/billing for the customers. Such time based metering may be simple and basic; however, if a customer has subscribed for a compute resource on a cloud platform, it may be very challenging to for the customer to track or gauge an actual usage of the compute resource. For example, a customer (e.g., an enterprise) may be running several to hundreds of workloads across dozens of different server configurations running dozens of different software and OS configurations. Moreover, if a customer wants to track a usage of the customer's subscribed resources in a similar fashion as a cloud platform does, the customer may have to run additional tracking applications which typically perform in-band tracking of the utilization of the cloud resources and/or the cloud services. The in-band tracking may be referred to as monitoring of various parameters of a resource (e.g., a networked resource) by instructions running on the resources' processor's pipeline, such as monitoring by the resource's operating system itself, drivers, or software. In some instances, such additional in-band tracking applications may interfere with the workloads in a production environment.

Additionally, in certain instances, metering based on an amount of time that a cloud service (e.g., a software) runs, may not impart clarity to the user about a real cost of compute and, accordingly, the customer may not be able to discover if the customer is being less than efficient. For example, a software that prints out "hello world" a million times may cost the same as a software training a machine learning model running on the same hardware using a conventional time based metering approach.

In accordance with the aspects of the present disclosure, in order to overcome above mentioned shortcomings, an enhanced technique of metering is presented which takes into consideration various hardware related usage aspects of a subscribed networked resource that are tracked in an out-of-band manner, for example. The networked resource may be subscribed by a client. The client may be an individual user or an enterprise, for example. The client can access the subscribed networked resource via a computing device. In accordance with the aspects of the present disclosure a consumption monitoring device may receive information regarding an out-of-band (OOB) performance parameter from a manageability controller corresponding to the networked resource subscribed by a client. In some examples, the OOB performance parameter may be a parameter that can be monitored by the manageability controller without disturbing or interfering with instructions executing on a main processing resource of the networked resource. Examples of the OOB performance parameters that may be measured by the manageability controller may include, but are not limited to, one or more of a CPU utilization, a memory bandwidth utilization, an input-output (IO) bandwidth utilization, a power consumption, or an operating frequency of the processing resource (e.g., the main processing resource) of the networked resource.

Further, the consumption monitoring device may determine a resource consumption metric (e.g., monetary amount) corresponding to the networked resource for the client based at least on the information regarding the OOB performance parameter received from the manageability controller. Moreover, the client may be charged based on the resource consumption metric. Thus, metering and billing, in accordance with aspects of the present disclosure, may be more accurate based on hardware related usage instead of less accurate, simple time-based calculations that account for nuances in usage. Additionally, metering based on OOB performance parameters cause no or little impact on workloads running on the subscribed network resource, whereas existing techniques may cause interruptions on the workloads. In some examples, various examples described in the present disclosure may be useful for a private cloud consumption-based billing use case.

Referring now to the drawings, in FIG. 1, a system 100 is presented, in accordance with an example. As depicted in FIG. 1, the system 100 may include a networked resource 102, a client device 104, and a consumption monitoring device 106.

In some examples, the networked resource 102, the client device 104, and the consumption monitoring device 106 may be coupled to each other via a network 108. Examples of the network 108 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 108 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 108 may be enabled via a wired (e.g., copper, optical communication, etc.) or wireless (e.g., Wi-Fi®, cellular communication, satellite communication, Bluetooth, etc.) communication technologies. In some examples, the network may be enabled via private communication links including, but not limited to, communication links established via Bluetooth, cellular communication, optical communication, radio frequency communication, wired (e.g., copper), and the like. In some examples, the private communication links may be direct communication links between the networked resource 102, the client device 104, and the consumption monitoring device 106.

The networked resource 102 may include any electronic device capable of being accessible over the network 108. Such electronic device may be capable of storing data, processing data, and/or communicating data with external devices over the network 108. Examples of the networked resource 102 may include, but are not limited to, a server, a storage device, a network switch, a router, a mobile communication device, a desktop computer, a portable computer, a networked resource enclosure, or a WLAN access point. The server may be a blade server, for example. The storage device may be a storage blade, for example. Further, in some examples, the networked resource enclosure may be a blade enclosure housing one or more blades (e.g., blade servers, storage blades, etc.). In some other examples, the networked resource 102 may also be a virtual resource such as, but not limited to, a container, a containerized application, or a virtual machine. Although the system 100 of FIG. 1 is shown to include one networked resource 102, use of more than one such networked resources is also envisioned within the purview of the present disclosure (see FIG. 2, for example).

The networked resource 102 may include a main processing resource (e.g., a processor) and a memory (e.g., a storage device) to execute an operating system (OS) to facilitate various operations and/or provide various compute and storage services. In some examples, the networked resource 102 may also include a manageability controller 112. The manageability controller 112 may also be referred to as baseboard management controller (BMC), in some examples. The manageability controller 112 may be used to implement services for the networked resource 102. The manageability controller 112 may be implemented using a separate processing resource from the main processing resource of the networked resource 102 which is used to execute the OS. In certain examples, when the networked resource 102 is a virtual resource such as the container, the containerized application, or the virtual machine, the manageability controller 112 may represent a manageability controller residing in a computing device (e.g., a server) hosting such virtual resource.

In some examples, the manageability controller 112 may provide so-called "lights-out" functionality for the networked resource 102. For example, the lights-out functionality may allow a user, such as a system administrator, to perform management operations on the networked resource 102 even if the OS is not installed or not functional on the networked resource 102. Moreover, in one example, the manageability controller 112 may run on an auxiliary power, thus the networked resource 102 need not be powered on to an ON-state where control of the networked resource 102 is handed over to an operating system after boot. As such, the manageability controller 112 may provide remote management access (e.g., system console access) regardless of whether the networked resource 102 is powered on, whether a primary subsystem hardware of the networked resource 102 is functioning, or whether an OS is operating or even installed. In some examples, the manageability controller 112 may also have management capabilities for sub-systems (e.g., cooling system) of a networked resource 102.

Moreover, in certain examples, the manageability controller 112 may provide so-called "out-of-band" (OOB) services, such as remote console access, remote reboot and power management functionality, monitoring health of the system, access to system logs, monitoring certain OOB performance parameters, and the like. The term OOB services as used herein may refer to any service provided by the manageability controller 112 execution of which does not interfere with instructions or workloads running on the main processing resource of the networked resource 102. The manageability controller 112 may include an interface (also referred to as a management channel), such as a network interface, and/or serial interface that the system administrator may use to remotely communicate with the manageability controller 112.

In some examples, sensors associated with the manageability controller 112 may measure internal physical variables of the networked resource 102 such as humidity, temperature, power supply voltage, communications parameters, fan speeds, operating system functions, certain OOB performance parameters, or the like. The term "OOB performance parameter" as used herein may refer to a performance parameter that is monitored without disturbing or interfering with instructions executing on the main processing resource of the networked resource 102. Examples of the OOB performance parameters that may be measured by the manageability controller 112 may include, but are not limited to, one or more of a CPU utilization, a memory bandwidth utilization, an input-output (IO) bandwidth utilization, a power consumption, or an operating frequency of the processing resource (e.g., the main processing resource) of the networked resource 102. As noted, the manageability controller 112 may allow for remote management of the device. For example, notifications may be made to a centralized station (e.g., the consumption monitoring device 106 in this example) using the manageability controller 112.

In some examples, the manageability controller 112 may be able to monitor an overall power consumed by the networked resource 102 as well as a power consumed by the main processing resource of the networked resource 102. In some implementations, the term "power consumption" may be understood to refer to the overall power consumed by the networked resource 102. As will be appreciated, in some other examples, the power consumption may also mean the power consumed by the main processing resource of the networked resource 102, without limiting the scope of the present disclosure. Further, in some examples, a processor (e.g., the main processing resource of the networked resource 102) may run on a clock and the manageability controller 112 may be able to measure how many clock cycles are being used by the main processing resource. Accordingly, in some examples, the term "CPU utilization" may refer to a number of clock cycles used by the main processing resource of the networked resource 102. Furthermore, in some examples, the term "memory bandwidth utilization" may refer to a percentage utilization of a memory bus (not shown) within the networked resource 102. Moreover, in some examples, the term "IO bandwidth utilization" may refer to a percentage utilization of a driver set of components, for example, one or more of a network IO, a storage IO, an accelerator IO, a general purpose graphics processing unit (GPU) IO within the networked resource 102.

In some examples, the networked resource 102 may be hosted on or form part of a cloud 110 managed by a cloud platform. The cloud 110 may be a public cloud, a private cloud, or a hybrid cloud. The cloud platform may offer its networked resources hosted on the cloud 100 for subscription and usage of compute, storage, and/or network capabilities. For example, the networked resource 102 may be subscribed by a client for using various compute, storage capabilities, and/or network capabilities applications, for example. The client device 104 may represent a computing device or console associated with the client using which the use can access the networked resource 102. The client may be, for example, an individual or an enterprise. Once the networked resource 102 is subscribed by the client, the client may be able to access the networked resource 102, via the client device 104, to use the compute and/or storage capabilities to run various workloads such as, but not limited to, machine learning; big data analytics; artificial intelligence; hosting of applications, content, and services, such as, social media services, video streaming, audio streaming, email services, etc.

In the traditional approaches, certain cloud platforms charge for use of the resources based on a time duration for which such resources are used by the users. Also, in order to determine consumption of the resources, the cloud platforms, in traditional approaches, may cause the resources to monitor and transmit certain in-band parameters of the resources. Monitoring and transmission of such in-band parameters may be achieved by instructions running on the resources' processor's pipeline. This could be an operating system itself, drivers, or software. Monitoring and transmission of the in-band parameters may, at times, cause interruptions in workloads running on the resources, since the monitoring and transmitting of in-band parameters may compete with the workloads for the resources.

In accordance with aspects of the present disclosure, in the system 100 of FIG. 1, the consumption monitoring device 106 may take into considerations various hardware related usage aspects of a subscribed resource instead of basic time based calculations performed using the in-band parameters. In some examples, the consumption monitoring device 106 may be communicatively coupled to the networked resource 102 via the network 108. More particularly, the consumption monitoring device 106 may be communicatively coupled to the manageability controller 112 of the networked resource 102 via a dedicated management channel.

The consumption monitoring device 106 may be a physical device, for example, a physical computing device or a server. In some other examples, the consumption monitoring device 106 may be hosted on a computing device as an application, a virtual machine, a container, or a containerized application. The application, the virtual machine, the container, or the containerized application may utilize resources (e.g., processing power and/or storage capacity) of a host computing device. The container or containerized application may be located on a single host computing device or distributed across multiple computing devices. The consumption monitoring device 106 may include a processing resource 114 and a machine-readable medium 116. The processing resource 114 may be coupled to the machine-readable medium 116.

The machine-readable medium 116 may be any electronic, magnetic, optical, or other physical storage device that may store data and/or executable instructions, for example, instructions 118. Therefore, the machine-readable medium 116 may be, for example, Random Access Memory (RAM), an Electrically Erasable Programmable Read-Only Memory (EEPROM), a storage drive, a flash memory, a Compact Disc Read Only Memory (CD-ROM), and the like. The machine-readable medium 116 may be non-transitory. As described in detail herein, the machine-readable medium 116 may be encoded with executable instructions 118 for performing one or more methods, for example, methods described in FIGS. 3 and 4.

Further, the processing resource 114 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing of the instructions 118 stored in the machine-readable medium 116, or combinations thereof. The processing resource 114 may fetch, decode, and execute the instructions 118 stored in the machine-readable medium 116 to charge the client for its usage of the networked resource 102. As an alternative or in addition to executing the instructions 118, the processing resource 114 may include at least one integrated circuit (IC), control logic, electronic circuits, or combinations thereof that include a number of electronic components for performing the functionalities intended to be performed by the consumption monitoring device 106.

As different from the traditional approaches, the consumption monitoring device 106, in some examples, utilizes OOB services enabled by the manageability controller 112 of the networked resource 102 to charge the client for its use of the networked resource 102. In some examples, the manageability controller 112 monitors one or more OOB performance parameters of the networked resource 102. As previously noted, examples of the OOB performance parameters that can be monitored by the manageability controller 112 may include, but are not limited to, one or more of the CPU utilization, the memory bandwidth utilization, the IO bandwidth utilization, the power consumption, or the operating frequency of the processing resource (e.g., the main processing resource) of the networked resource 102.

Further, the manageability controller 112 may transmit information regarding the OOB performance parameters to the consumption monitoring device 106. As will be appreciated, the monitoring and transmission of such OOB performance parameters by the manageability controller 112 may not interfere with instructions running workloads on the main processing resource of the networked resource 102 itself. That is to say, instructions that are running the OS, drivers, and software on the networked resource 102 are uninterrupted as the manageability controller 112 monitors and/or transmits the information regarding the OOB performance parameters.

In some examples, the processing resource 114 of the consumption monitoring device 106 may execute at least some of the instructions 118 to receive information regarding the OOB performance parameters from the manageability controller 112 of the networked resource 102. The consumption monitoring device 106 may receive the information regarding the OOB performance parameters via the dedicated management channel enabled by the manageability controller 112 over the network 108. Further, in some examples, the processing resource 114 of the resource consumption device 106 may execute at least some of the instructions 118 to determine a resource consumption metric corresponding to the networked resource 102 for the client based at least on the information regarding the OOB performance parameter received from the manageability controller 112. The term "resource consumption metric" as used herein may refer to a monetary amount that the client may be charged for its usage of the networked resource 102. Moreover, the processing resource 114 may execute at least some of the instructions 118 to generate a billing report and charge the client for its use of the networked resource 102 based on the resource consumption metric. Additional operational details of the resource consumption device 106 will be described in conjunction with methods described in FIGS. 3 and 4.

As will be appreciated, the consumption monitoring device 106 may remotely monitor the OOB performance parameters from the networked resource 102 and is able to charge the client for its usage of the networked resource 102. In particular, in some examples, the manageability controller 112 of the networked resource 102 may monitor these OOB performance parameters in an OOB manner, thereby not impacting workloads running on the networked resource 102. Further, since the OOB performance parameters are based on various hardware and power consumption related aspects, the resource consumption metric (i.e., the monetary amount) calculated by the consumption monitoring device 106 may be more realistic and relatable to actual investment and consumption of the networked resource 102.

Figure 2:
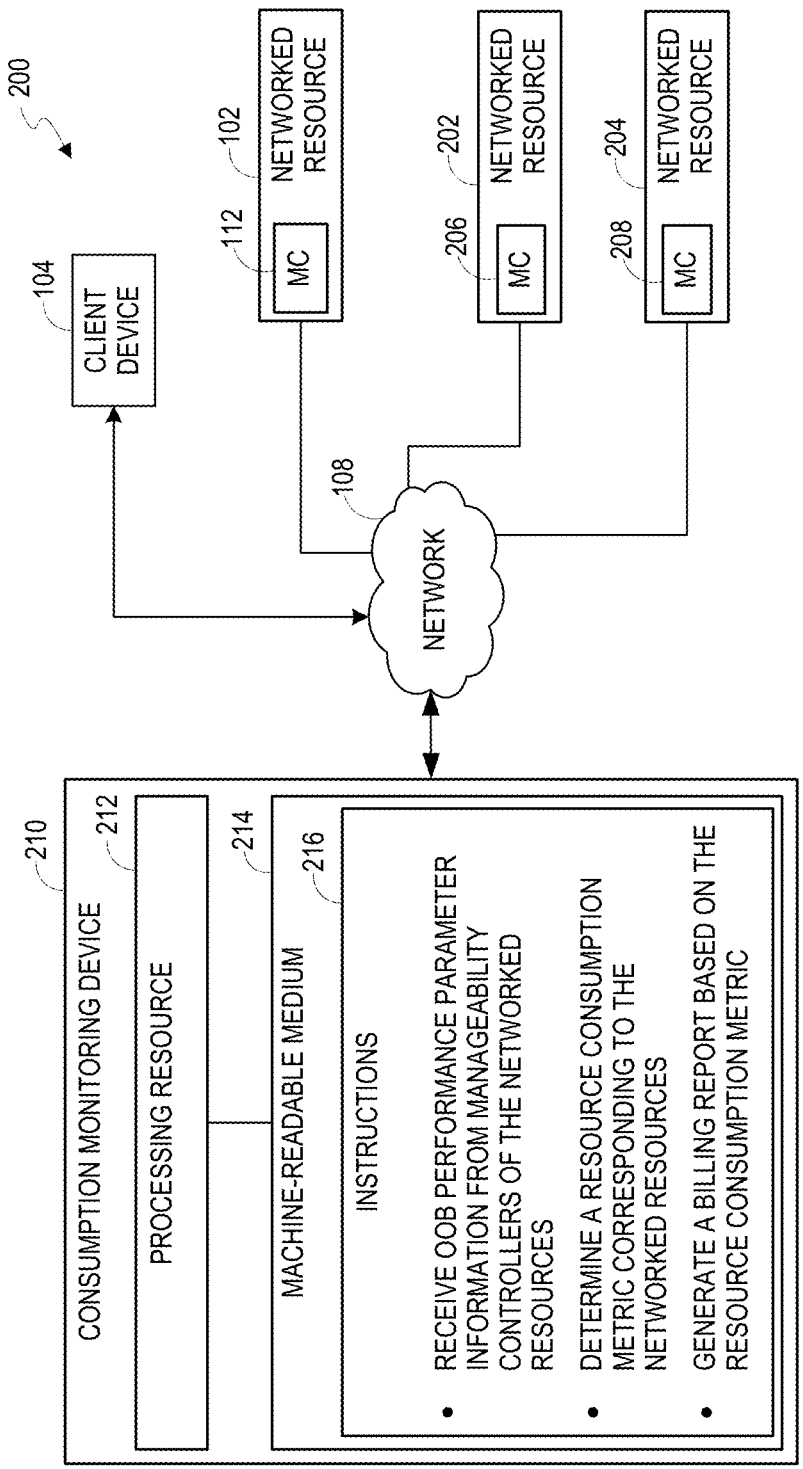
FIG. 2 is a system including a consumption monitoring device coupled to a networked resource, in accordance with another example.

Referring now to FIG. 2, a system 200 is presented, in accordance with another example. The system 200 of FIG. 2 may be representative of one example of the system 100 of FIG. 1. In comparison to FIG. 1, the system 200 is shown to include additional networked resources 202, 204 which may be subscribed to by the client, for example. The networked resources 202, 204 may be analogous to the networked resource 102. The networked resources 202, 204 may also include manageability controllers 206, 208, respectively. The manageability controllers 206, 208 may be analogous to the manageability controller 112. The manageability controllers 206, 208 may enable monitoring of the OOB performance parameters in a similar fashion as performed by the manageability controller 112. In some examples, the manageability controllers 206, 208 may also monitor OOB performance parameters, such as, but not limited to, one or more of a CPU utilization, a memory bandwidth utilization, an IO bandwidth utilization, a power consumption, or an operating frequency of the processing resource corresponding to the networked resources 202, 204, respectively.

Although, the system 200 of FIG. 2 is shown to include three networked resources 102, 202, 204, use of less than three or more than three networked resources is also envisioned. In some examples, although not shown, the networked resources 102, 202, 204 may be hosted on one or more clouds. In some examples, the networked resources 102, 202, 204 may be hosted on a common cloud. In some other examples, the networked resources 102, 202, 204 may be distributed across plurality of clouds. In some examples, the networked resources 102, 202, 204 may belong to different cloud providers. In certain examples, the networked resources 102, 202, 204 may be distributed across different types of clouds (e.g., a public cloud, a private cloud, or a hybrid cloud).

Further, in some examples, the system 200 may include a consumption monitoring device 210 coupled to the networked resources 102, 202, 204 via the network 108. The consumption monitoring device 210 may be representative of one example of the consumption monitoring device 106 of FIG. 1 and is used to generate a billing report for the client for its use of the networked resources 102, 202, 204. The consumption monitoring device 210 may include a processing resource 212 and a machine-readable medium 214 which are analogous to the processing resource 114 and the machine-readable medium 116, respectively. In some examples, the machine-readable medium 214 may be encoded with executable instructions 216 for performing one or more methods, for example, methods described in FIGS. 3 and 4.

In some examples, the processing resource 212 may execute at least some of the instructions 216 to receive information regarding the OOB performance parameters from the manageability controllers 112, 206, and 208 of the networked resources 102, 202, and 204. Further, in some examples, the processing resource 212 of the resource consumption device 106 may execute at least some of the instructions 216 to determine a resource consumption metric corresponding to the networked resources 102, 202, and 204 for the client based at least on the information regarding the OOB performance parameter received from the manageability controllers 112, 206, and 208. Moreover, the processing resource 212 may execute at least some of the instructions 216 to generate a billing report and charge the client for its use of the networked resources 102, 202, and 204 based on the resource consumption metric. Additional operational details of the resource consumption device 106 will be described in conjunction with method described in FIG. 4.

Figure 3:
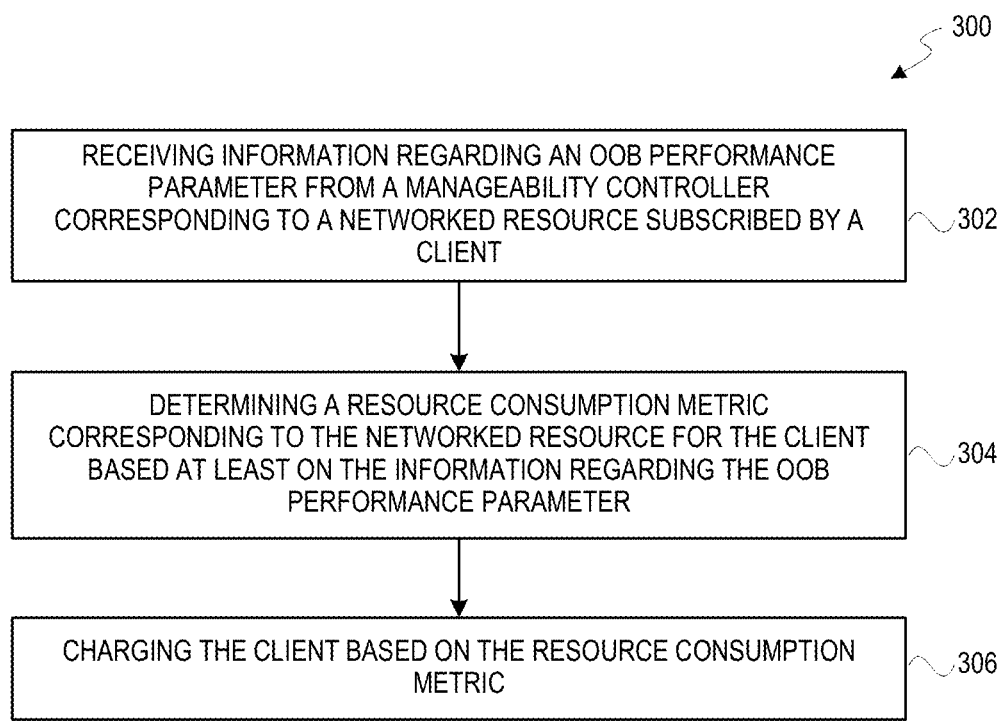
FIG. 3 is a flow diagram depicting a method for charging a client for its usage of a networked resource, in accordance with an example.

Referring now to FIG. 3, a flow diagram depicting a method 300 for charging a client for its usage of a networked resource (e.g., the networked resource 102) is presented, in accordance with an example. For illustration purposes, the method 300 will be described in conjunction with the system 100 of FIG. 1. As will be appreciated, the method 300 is also applicable to the system 200 of FIG. 2. The method 300 may include method blocks 302, 304, and 306 (hereinafter collectively referred to as blocks 302-306) which may be performed by a processor based system, for example, the consumption monitoring device 106. In particular, each of the method blocks 302-306 may be executed by the processing resource 114 by executing the instructions 118 stored in the machine-readable medium 116 (see FIG. 1).

At block 302, the consumption monitoring device 106 may receive the information regarding the OOB performance parameter from the manageability controller 112 corresponding to the networked resource 102 subscribed by the client. The consumption monitoring device 106 may receive the information regarding the OOB performance parameter from the manageability controller 112 via the network 108. In some examples, the consumption monitoring device 106 may send a request to the manageability controller 112 of the networked resource 102 to provide the information regarding the OOB performance parameter for a consumption period. In some examples, the consumption period may be defined by the consumption monitoring device 106 in the request. The consumption period may be any predetermined time duration, such as, but not limited to, a certain number of seconds, minutes, hours, a day, a week, a month, a year, and the like. Without limiting the scope of the present disclosure, the consumption period may be customized to any desired time duration. In certain other examples, the manageability controller 112 may be preconfigured with the consumption period. Moreover, the consumption monitoring device 106 may send the request for OOB performance parameters at periodic intervals or at any custom time. In some examples, the consumption monitoring device 106 may send the request to the manageability controller 112 upon request from the client device 104.

Further, in some examples, at block 304, the consumption monitoring device 106 may determine a resource consumption metric (e.g., a monetary amount/charges) corresponding to the networked resource 102 for the client based at least on the information regarding the OOB performance parameter received from the manageability controller 112. In some examples, the consumption monitoring device 106 may determine the resource consumption metric as a function of one or more of a power consumption metric, a CPU consumption metric, a memory consumption metric, an IO consumption metric (described in FIG. 4). Additional details of determining the resource consumption metric is descried in conjunction with a method of FIG. 4. Moreover, in some examples, the consumption monitoring device 106 may charge the client based on the resource consumption metric. In some examples, charging the client may include communicating a billing report mentioning the monetary amount for the usage of the networked resource 102 to the client device 104. In some examples, the consumption monitoring device 106 may charge the monetary amount to a bank account registered with the consumption monitoring device 106 by the client, for example, with auto debit authorization.

Figure 4:
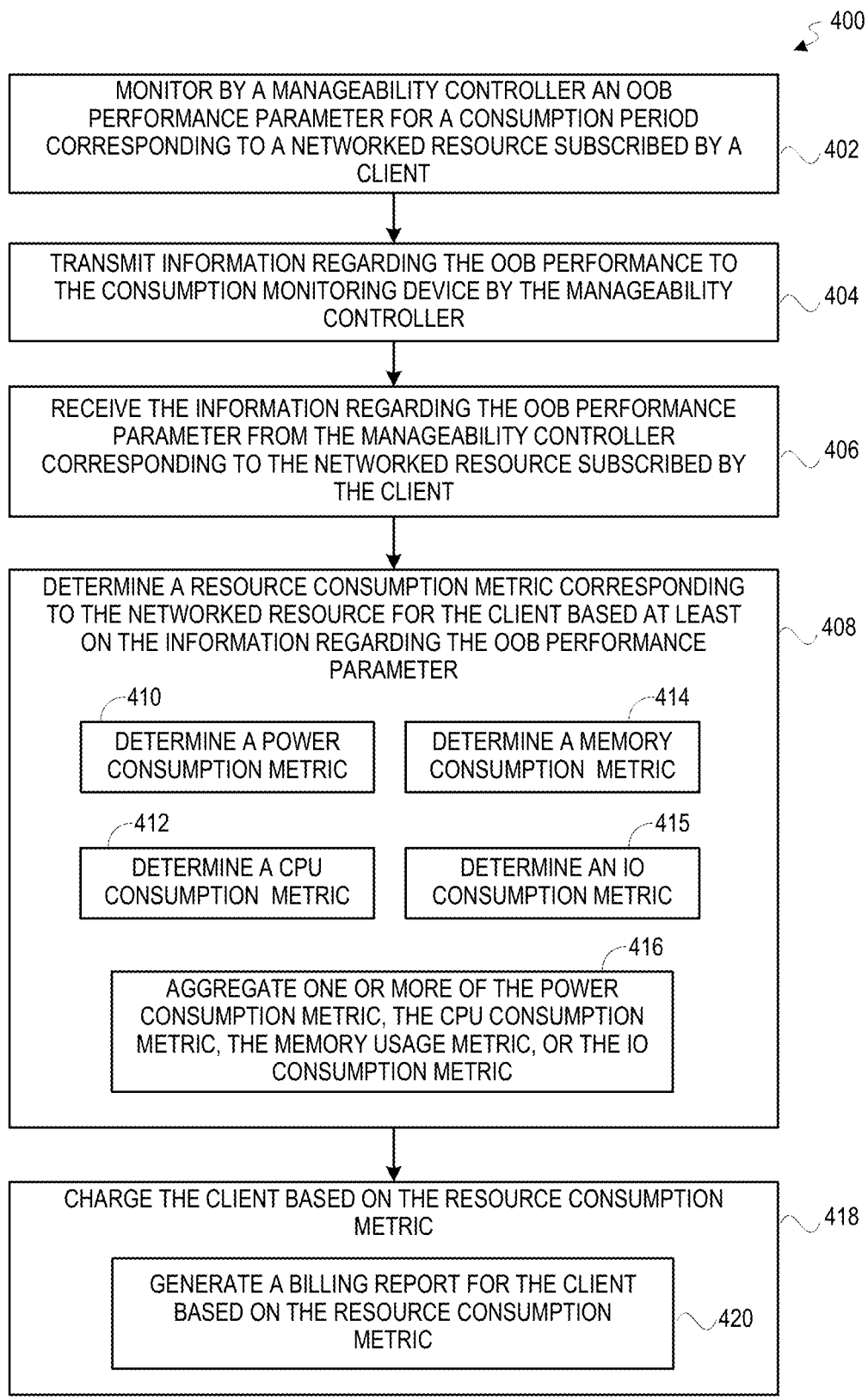
FIG. 4 is a flow diagram depicting a method for charging a client for its usage a the networked resource, in accordance with another example.

FIG. 4 is a flow diagram depicting a method for charging a client for its usage of a networked resource, in accordance with another example. For illustration purposes, the method 400 will be described in conjunction with the system 100 of FIG. 1 and the system 200 of FIG. 2. The method 400 may include blocks 402, 404, 406, 408, 410, 412, 414, 415, 416, 418, and 420, of which certain blocks may be performed by a processor based system, for example, the consumption monitoring device 106. In particular, one or more of the method blocks 406, 408, 410, 412, 414, 415, 416, 418, and 420 may be executed by the processing resources 114, 212 by executing the instructions 118, 216, respectively.

At block 402, a manageability controller may monitor an OOB performance parameter corresponding to a networked resource for a consumption period. In the example of FIG. 1, the manageability controller 112 may monitor one or more OOB performance parameters corresponding to the networked resource 102 for a consumption period. Similarly, in the example of FIG. 2, the manageability controllers 112, 206, and 208 may monitor one or more OOB performance parameters corresponding to the networked resources 102, 202, and 204, respectively, for a consumption period. The consumption period may be any predetermined time duration, such as, but not limited to, a certain number of seconds, minutes, hours, a day, a week, a month, a year, and the like. Examples of the OOB performance parameters that may be monitored by the manageability controllers 112, 206, and 208 may include, but are not limited to, one or more of the CPU utilization, the memory bandwidth utilization, the IO bandwidth utilization, the power consumption, or the operating frequency of the processing resource corresponding to the networked resources 102, 202, or 204.

Further, in some examples, at block 404, the manageability controller may send the information regarding the OOB performance parameters to a consumption monitoring device. For example, in the system 100 of FIG. 1, the manageability controller 112 may send the information regarding the OOB performance parameters to the consumption monitoring device 106. Similarly, in the system 200 of FIG. 2, the manageability controllers 112, 206, and 208 may send the information regarding the OOB performance parameters corresponding to the networked resources 102, 202, and 204, respectively, to the consumption monitoring device 210. In some examples, the information regarding the OOB performance parameters may include values of one or more of the CPU utilization, the memory bandwidth utilization, the IO bandwidth utilization, the power consumption, or the operating frequency of the processing resource corresponding to the networked resources 102, 202, or 204. At block 406, the consumption monitoring device 106 or 210 may receive the information regarding OOB performance parameters from one or more of the manageability controllers 112, 206, 208 in the respective systems 100, 200.

Furthermore, in some examples, at block 408, the consumption monitoring device 106 or 210 may determine a resource consumption metric corresponding to the networked resources 102, 202, or 204 for the client based at least on the information regarding the OOB performance parameter(s). In some examples, the resource consumption metric may be a function of one or more of a power consumption metric, a CPU consumption metric, a memory consumption metric, or an IO consumption metric. Accordingly, determining the resource consumption metric may include determining one or more of the power consumption metric, the CPU consumption metric, the memory consumption metric, or the IO consumption metric at blocks 410, 412, 414, and 415 (hereinafter collectively referred to as blocks 410-415), respectively. Also, in some examples, one or more of the power consumption metric, the CPU consumption metric, the memory consumption metric, or the IO consumption metric may be aggregated (e.g., summed-up) to determine the resource consumption metric (see block 416).

In some examples, the term "power consumption metric" as used herein may refer to a monetary amount for consumption of electricity by one or more networked resources subscribed by the client. Further, in some examples, the term "CPU consumption metric" as used herein may refer to a monetary amount for consumption of a compute capability of one or more networked resources subscribed by the client. Furthermore, in some examples, the term "memory consumption metric" as used herein may refer to a monetary amount for consumption of a memory bandwidth of one or more networked resources subscribed by the client. Moreover, in some examples, the term "IO consumption metric" as used herein may refer to a monetary amount for consumption of an IO capabilities (e.g., driver set of components, network connectivity components, etc.) of one or more networked resources subscribed by the client. Blocks 410-415 will be described hereinafter. It may be noted that in some examples, fewer of the blocks 410-415 may be implemented. Further, in certain examples, the method 400 may include determining additional and/or different metrics than ones determined at blocks 410-415 to determine the resource consumption metric.

Referring now to the blocks 410-415, at block 410, the consumption monitoring device 106 or 210 may determine the power consumption metric (PCM) based on the power consumption corresponding to one or more of the networked resources 102, 202, and 204, and a per-unit cost of a power (e.g., energy or electricity). The power consumption may be measured in energy-hours. By way of example, the consumption monitoring device 106 or 210 may determine the power consumption metric (PCM) using equation (1).

$$PCM = \sum_{k=1}^{N1}\left(\sum_{t=1}^{T}(P_{consum_{k-t}} * Cost_{unitEn_{k-t}})\right) \quad \text{Equation (1)}$$

where, $P_{consum_{k-t}}$ is the power consumption in energy-hours for a networked resource k (k ∈ 1, 2, . . . , N1) at time t, $Cost_{unitEn_{k-t}}$ is the per-unit cost of power for the networked resource k at the time t, N1 is a total number of networked resources subscribed by the client, and T is a consumption period for the power consumption metric (PCM) is to be calculated.

In the example of FIG. 1, a value of k is 1 (k=1) as the client has subscribed for a single networked resource 102. Accordingly, the consumption monitoring device 106 may determine the power consumption metric (PCM) as a product of the power consumption (e.g., power consumed by the networked resource 102) and the per-unit cost of power for each time t aggregated (e.g., summed) over the consumption period T. Further, in the example of FIG. 2, a value of k is 3 (k=3) as the client has subscribed for three networked resources 102, 202, and 204. Accordingly, the consumption monitoring device 210 may determine the power consumption metric (PCM) as a sum of a product of the power consumption (e.g., power consumed by the networked resource 102) and the per-unit cost of power for each time t aggregated over the consumption period T corresponding to each of the networked resources subscribed by the client (in this example, three networked resources 102, 202, and 204).

In some examples, at block 414, the consumption monitoring device 106 or 210 may determine the CPU consumption metric (CCM) based on the CPU utilization, a base frequency of a processing core (e.g., the main processing resource of the networked resources 102, 202, or 204), a number of cores, and a cost per clock cycle corresponding to the networked resources 102, 202, or 102, 202, or 204. In some examples, the CPU utilization may be measured as number utilized clock cycles. By way of example, the consumption monitoring device 106 or 210 may determine the CPU consumption metric (CCM) using equation (2).

$$CCM = \sum_{k=1}^{N1}\left(\sum_{i=1}^{T}((CPU_{utilization_{k-t}} * F * N2 * Cost_{perCC_k} * \Delta t))\right) \quad \text{Equation (2)}$$

where, $CPU_{utilization_{k-t}}$ is the CPU utilization for a networked resource k (k ∈ 1, 2, . . . , N1) at time t, F is the base frequency, $Cost_{perCC_k}$ is the cost per clock cycle for the networked resource k, N2 is a total number of processing cores in the networked resource k, N1 is a total number of networked resources subscribed by the client, and T is the consumption period for the CPU consumption metric (CCM) is to be calculated. In some examples, Δt may represent a time deviation (e.g., difference) between a current value oft (i.e., value oft at the time of current/ongoing execution of equation (2)) and previous value of t (i.e., value of t at the time of immediate earlier execution of equation (2)).

In some examples, the cost per clock cycle ($Cost_{perCC_k}$) may be determined based on a cost of the main processing resource ($Cost_{PR-k}$) of the networked resource k and total clock cycles (($CC_{Total}$) (e.g., maximum number of clock cycles) for which such main processing resource can be operated safely. For example, the cost per clock cycle may be determined by the consumption monitoring device 106 or 210 using equation (3).

$$Cost_{perCC-k} = \frac{Cost_{PR-k}}{CC_{Total}} \quad \text{Equation (3)}$$

In the example of FIG. 1, a value of k is 1 (k=1) as the client has subscribed for a single networked resource 102. Accordingly, the consumption monitoring device 106 may determine the CPU consumption metric (CCM) as a product of the CPU utilization, the base frequency of the processing core, the number of cores, a deviation time, and the cost per clock cycle corresponding to the networked resource 102 for each time t aggregated over the consumption period T. Further, in the example of FIG. 2, a value of k is 3 (k=3) as the client has subscribed for three networked resources 102, 202, and 204. Accordingly, the consumption monitoring device 210 may determine the CPU consumption metric (CCM) as a sum of a product of the CPU utilization, the base frequency of the processing core, the number of cores, a deviation time, and the cost per clock cycle for each time t aggregated over the consumption period T corresponding to each of the networked resources subscribed by the client (in this example, three networked resources 102, 202, and 204).

Moreover, in certain examples, at block 414, the consumption monitoring device 106 or 210 may determine the memory consumption metric (MCM) based on a memory bandwidth utilization, a maximum available memory bandwidth, and a cost per unit memory bandwidth corresponding to the networked resources 102, 202, or 204. In some examples, the memory bandwidth utilization may be measured as a percentage of the maximum available memory bandwidth. By way of example, the consumption monitoring device 106 or 210 may determine the memory consumption metric (MCM) using equation (4).

$$MCM = \sum_{k=1}^{N1}\left(\sum_{t=1}^{T}(MBW_{used_{k-t}} * MBW_{max_k} * Cost_{unitMBW_{k-t}})\right) \quad \text{Equation (4)}$$

where, $MBW_{used_{k-t}}$ is the memory bandwidth utilization for a networked resource k (k ∈ 1, 2, . . . , N1) at time t, $MBW_{max_k}$ is the maximum available memory bandwidth for the networked resource k, $Cost_{unitMBW_{k-t}}$ is the cost per unit memory bandwidth for the networked resource k at time t, N1 is a total number of networked resources subscribed by the client, and T is the consumption period for the memory consumption metric (MCM) is to be calculated.

In the example of FIG. 1, a value of k is 1 (k=1) as the client has subscribed for a single networked resource 102. Accordingly, the consumption monitoring device 106 may determine the memory consumption metric (MCM) as a product of the memory bandwidth utilization, the maximum available memory bandwidth, and the cost per unit bandwidth for each time t aggregated (e.g., summed) over the consumption period T. Further, in the example of FIG. 2, a value of k is 3 (k=3) as the client has subscribed for three networked resources 102, 202, and 204. Accordingly, the consumption monitoring device 210 may determine the memory consumption metric (MCM) as a sum of a product of the memory bandwidth utilization, the maximum available memory bandwidth, and the cost per unit bandwidth for each time t aggregated over the consumption period T corresponding to each of the networked resources subscribed by the client (in this example, three networked resources 102, 202, and 204).

Moreover, in certain examples, at block 415, the consumption monitoring device 106 or 210 may determine the IO consumption metric (IOCM) based on the IO bandwidth utilization, a maximum available IO bandwidth, and a cost per unit IO bandwidth corresponding to the networked resources 102, 202, or 204. In some examples, the IO bandwidth utilization may be measured as a percentage of the maximum available IO bandwidth. By way of example, the consumption monitoring device 106 or 210 may determine the IO consumption metric (IOCM) using equation (5).

$$IOCM = \sum_{k=1}^{N1}\left(\sum_{t=1}^{T}(IOBW_{used_{k-t}} * IOBW_{max_k} * Cost_{unitIOBW_{k-t}})\right) \quad \text{Equation (5)}$$

where, $IOBW_{used_{k-t}}$ is the IO bandwidth utilization for a networked resource k (k ∈ 1, 2, . . . , N1) at time t, $IOBW_{max_k}$ is the maximum available IO bandwidth for the networked resource k, $Cost_{unitIOBW_{k-t}}$ is the cost per unit IO bandwidth for the networked resource k at time t, N1 is a total number of networked resources subscribed by the client, and T is the consumption period for theIO consumption metric (IOCM) is to be calculated.

In the example of FIG. 1, a value of k is 1 (k=1) as the client has subscribed for a single networked resource 102. Accordingly, the consumption monitoring device 106 may determine the IO consumption metric (IOCM) as a product of the IO bandwidth utilization, the maximum available IO bandwidth, and the cost per unit IO bandwidth for each time t aggregated (e.g., summed) over the consumption period T. Further, in the example of FIG. 2, a value of k is 3 (k=3) as the client has subscribed for three networked resources 102, 202, and 204. Accordingly, the consumption monitoring device 210 may determine the IO consumption metric (IOCM) as a sum of a product of the IO bandwidth utilization, the maximum available IO bandwidth, and the cost per unit IO bandwidth for each time t aggregated over the consumption period T corresponding to each of the networked resources subscribed by the client (in this example, three networked resources 102, 202, and 204).

Moreover, at block 416, the consumption monitoring device 106 or 210 may aggregate one or more of the power consumption metric, the CPU consumption metric, the memory consumption metric, or IO consumption metric to determine the resource consumption metric (RCM). For example, the consumption monitoring device 106 or 210 may determine the resource consumption metric (RCM) as the function of one or more of the power consumption metric (PCM), the CPU consumption metric (CCM), the memory consumption metric (MCM), or the IO consumption metric (IOCM). For example, the consumption monitoring device 106 or 210 may determine the resource consumption metric (RCM) using following equation (6).

$$RCM = PCM + CCM + MCM + IOCM \quad \text{Equation (6)}$$

Although in the example presented herein, the resource consumption metric (RCM) is described to be determined as a simple sum of the power consumption metric (PCM), the CPU consumption metric (CCM), the memory consumption metric (MCM), or the IO consumption metric (IOCM), the resource consumption metric (RCM) may be determined using any custom function of one or more of the power consumption metric (PCM), the CPU consumption metric (CCM), the memory consumption metric (MCM), or the IO consumption metric (IOCM), without limiting the scope of the present disclosure. Further, the resource consumption metric (RCM) may also be determined using any combination of the four metrics used in the equation (6) and any additional metrics determined based on additional OOB performance parameters, without limiting the scope of the present disclosure.

Additionally, in some examples, at block 418, the consumption monitoring device 106 or 210 may charge the client based on the resource consumption metric (RCM) determined at block 408. Charging the client for its use of the networked resources 102, 202, or 204 may include generating a billing report at block 420. In some examples, the billing report may include information about the monetary amount (e.g., dollars) that the client is to pay for the use of the networked resource(s) it has subscribed for/allocated to. In some examples, the billing report may include a break-up of the monetary amount corresponding to each of the power consumption metric (PCM), the CPU consumption metric (CCM), the memory consumption metric (MCM), the IO consumption metric (IOCM). In certain other examples, the billing report may include a payment link and or payment instructions for the client execute the payment of the monetary amount mentioned in the billing report. The billing report may be communicated to the client device 104 electronically (e.g., via email, text message, and the like) or via a paper media. In some examples, the consumption monitoring device 106 or 210 may charge the monetary amount to a bank account registered with the consumption monitoring device 106 by the client, for example, with auto debit authorization.

Figure 5:
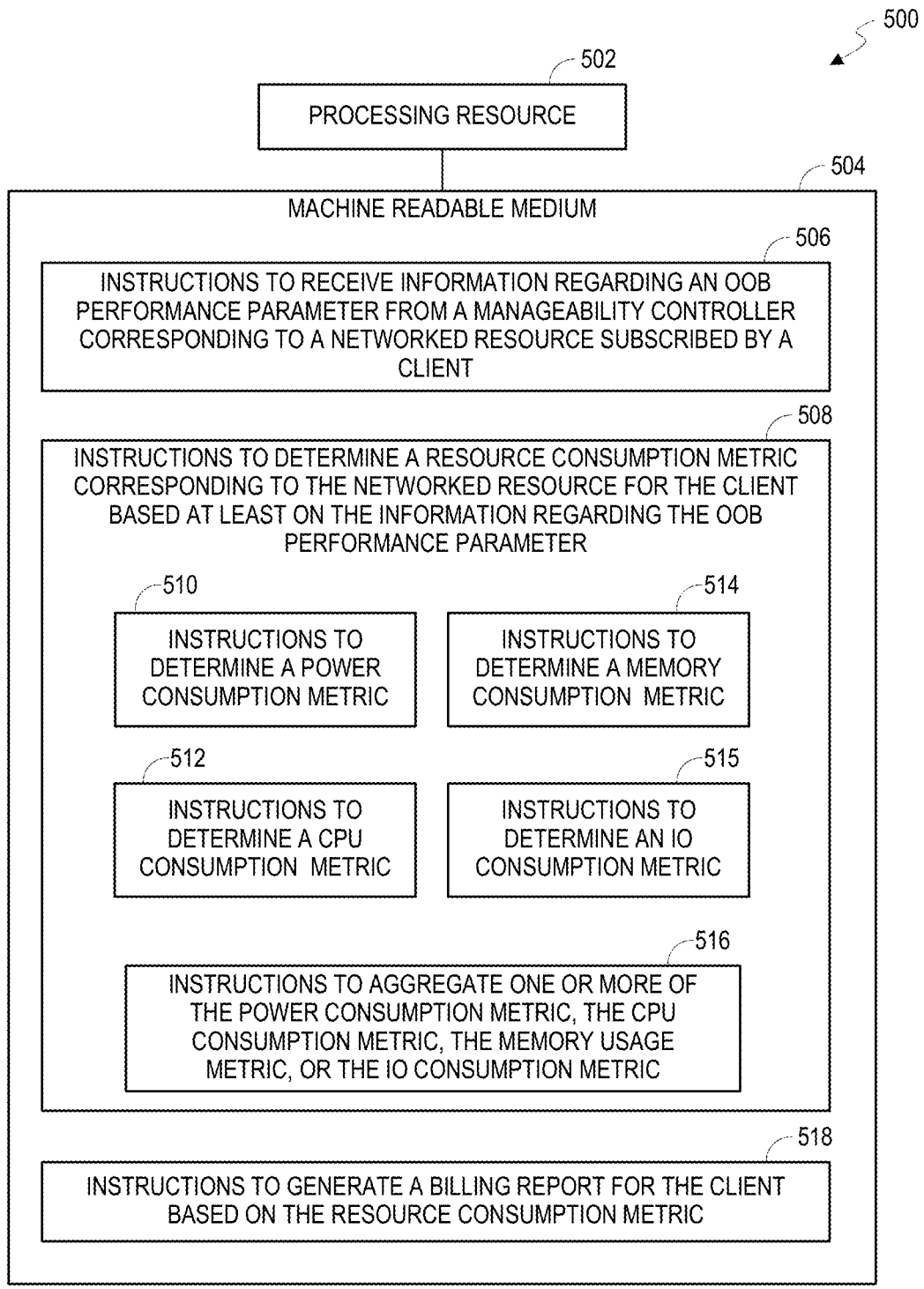
FIG. 5 is a block diagram depicting a processing resource and a machine-readable medium encoded with example instructions to generate a billing report for a client for its usage of a networked resource, in accordance with an example.

Moving to FIG. 5, a block diagram 500 depicting a processing resource 502 and a machine-readable medium 504 encoded with example instructions to generate a billing report for a client for its usage of networked resource(s), in accordance with an example. The machine-readable medium 504 may be non-transitory and is alternatively referred to as a non-transitory machine-readable medium 504. In some examples, the machine-readable medium 504 may be accessed by the processing resource 502. In some examples, the processing resource 502 may represent one example of the processing resource 114 of the consumption monitoring device 106 of FIG. 1 or the processing resource 212 of the consumption monitoring device 210 FIG. 2. Further, the machine-readable medium 504 may represent one example of the machine-readable medium 116 of the consumption monitoring device 106 of FIG. 1 or the machine-readable medium 214 of the consumption monitoring device 210 FIG. 2.

The machine-readable medium 504 may be any electronic, magnetic, optical, or other physical storage device that may store data and/or executable instructions. Therefore, the machine-readable medium 504 may be, for example, RAM, an EEPROM, a storage drive, a flash memory, a CD-ROM, and the like. As described in detail herein, the machine-readable medium 504 may be encoded with executable instructions 506, 508, 510, 512, 514, 515, 516, and 518 (hereinafter collectively referred to as instructions 506-518) for performing one or more methods, for example, the method 300 described in FIG. 3 or certain blocks described in method 400 of FIG. 4. The instructions 506-518 may represent one example of the instructions 118 or 216.

The processing resource 502 may be a physical device, for example, one or more CPU, one or more semiconductor-based microprocessor, one or more GPU, ASIC, FPGA, other hardware devices capable of retrieving and executing the instructions 506-518 stored in the machine-readable medium 504, or combinations thereof. In some examples, the processing resource 502 may fetch, decode, and execute the instructions 506-518 stored in the machine-readable medium 504 to generate the billing report for the client. In certain examples, as an alternative or in addition to retrieving and executing the instructions 506-518, the processing resource 502 may include at least one IC, other control logic, other electronic circuits, or combinations thereof that include a number of electronic components for performing the functionalities intended to be performed by the consumption monitoring device 106 of FIG. 1 or the consumption monitoring device 210 of FIG. 2. In the description hereinafter, for ease of illustration, the instructions 506-518 are described with reference to the system 100 of FIG. 1. As will be appreciated, the instructions 506-518 may also be executed by the processing resource 212 on the consumption monitoring device 210 of FIG. 2.

In some examples, the instructions 506 when executed by the processing resource 502 may cause the processing resource 502 to receive information regarding the OOB performance parameter from the manageability controller 112 corresponding to the networked resource 102 subscribed by the client. Further, the instructions 508 when executed by the processing resource 502 may cause the processing resource 502 to determine the resource consumption metric corresponding to the networked resource 102 for the client based at least on the information regarding the OOB performance parameter received from the manageability controller 112.

In some examples, the instructions 508 may include instructions 516 and one or more of sub-instructions 510, 512, 514, and 515. For example, the instructions 510 when executed by the processing resource 502 may cause the processing resource 502 to determine a power consumption metric (e.g., the power consumption metric (PCM)) based on the power consumption corresponding to the networked resource 102 and the per-unit cost of the power. Further, in some examples, the instructions 512 when executed by the processing resource 502 may cause the processing resource 502 to determine a CPU consumption metric (e.g., the CPU consumption metric (CCM)) based on the CPU utilization, the base frequency of the processing core, the number of cores, and the cost per clock cycle corresponding to the networked resource 102.

Moreover, in some examples, the instructions 514 when executed by the processing resource 502 may cause the processing resource 502 to determine a memory consumption metric (e.g., the memory consumption metric (MCM)) based on the memory bandwidth utilization, the maximum available memory bandwidth, and the cost per unit bandwidth corresponding to the networked resource 102. Also, in some examples, the instructions 515 when executed by the processing resource 502 may cause the processing resource 502 to determine an IO consumption metric (e.g., the IO consumption metric (IOCM)) based on the IO bandwidth utilization, the maximum available IO bandwidth, and the cost per unit bandwidth corresponding to the networked resource 102. Additional details of determining the power consumption metric, the CPU consumption metric, and the memory consumption metric are described in conjunction with FIG. 4.

Furthermore, in some examples, the instructions 516 when executed by the processing resource 502 may cause the processing resource 502 to aggregate one or more of the power consumption metric, the CPU consumption metric, the memory consumption metric, or the IO consumption metric, to determine the resource consumption metric (RCM) (e.g., see step 416 of the method 400 of FIG. 4). Moreover, in some examples, the instructions 518 when executed by the processing resource 502 may cause the processing resource 502 to generate the billing report for the client based on the resource consumption metric.

As will be appreciated, the consumption monitoring device (106 or 210) may remotely monitor the OOB performance parameters from the networked resource (102, 202, and 204) and is able to charge the client for its usage of the networked resource 102. In particular, in some examples, the manageability controllers 112, 206, and 208 of the networked resources 102, 202, and 204, respectively, may monitor these OOB performance parameters in an OOB manner, thereby not impacting workloads running on the respective networked resources 102, 202, 204. Further, since the OOB performance parameters are based on various hardware and power consumption related aspects, the resource consumption metric (i.e., the monetary amount), in accordance with some examples, may be more realistic and relatable to actual investment and consumption of the networked resource 102.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
    receiving, by a consumption monitoring device via a network, information regarding an out-of-band (OOB) performance parameter from a manageability controller corresponding to a networked resource subscribed by a client, wherein the consumption monitoring device is communicatively coupled to the networked resource hosted on a cloud;
    determining, by the consumption monitoring device, a resource consumption metric corresponding to the networked resource for the client based at least on the information regarding the OOB performance parameter received from the manageability controller, wherein the resource consumption metric is a monetary amount calculated based at least on the OOB performance parameter be charged to the client for usage of the networked resource; and
    charging, by the consumption monitoring device, the client based on the resource consumption metric.

2. The method of claim 1, further comprising generating a billing report for the client based on the resource consumption metric.

3. The method of claim 1, further comprising:
    monitoring, by the manageability controller, the OOB performance parameter corresponding to the networked resource for a consumption period; and
    transmitting the information regarding an OOB performance to the consumption monitoring device.

4. The method of claim 1, wherein the networked resource comprises a server, a storage device, a network switch, a router, a mobile communication device, a desktop computer, a networked resource enclosure, a portable computer, WLAN access point, a container, a containerized application, or a virtual machine.

5. The method of claim 1, wherein the OOB performance parameter comprises a CPU utilization, a memory bandwidth utilization, an input-output (IO) bandwidth utilization, a power consumption, or an operating frequency.

6. The method of claim 1, wherein the resource consumption metric is a function of one or more of a power consumption metric, a CPU consumption metric, a memory consumption metric, or an IO consumption metric.

7. The method of claim 6, wherein determining the resource consumption metric comprises determining the power consumption metric based on a power consumption corresponding to the networked resource and a per-unit cost of a power, wherein the power consumption is measured in energy-hours.

8. The method of claim 6, wherein determining the resource consumption metric comprises determining the CPU consumption metric based on a CPU utilization, a base frequency of a processing core, a number of cores, and a cost per clock cycle corresponding to the networked resource.

9. The method of claim 6, wherein determining the resource consumption metric comprises determining the memory consumption metric based on a memory bandwidth utilization, a maximum available memory bandwidth, and a cost per unit memory bandwidth corresponding to the networked resource.

10. The method of claim 6, wherein determining the resource consumption metric comprises determining the TO consumption metric based on an TO bandwidth utilization, a maximum available TO bandwidth, and a cost per unit TO bandwidth corresponding to the networked resource.

11. A consumption monitoring device, comprising:
    a machine-readable medium storing executable instructions; and
    a processing resource coupled to the machine-readable medium, wherein the processing resource executes the instructions to:
    receive information regarding an OOB performance parameter from a manageability controller corresponding to a networked resource subscribed by a client, wherein the consumption monitoring device is communicatively coupled to the networked resource hosted on a cloud;
    determine a resource consumption metric corresponding to the networked resource for the client based at least on the information regarding the OOB performance parameter received from the manageability controller, wherein the resource consumption metric is a monetary amount calculated based at least on the OOB performance parameter be charged to the client for usage of the networked resource; and
    generate a billing report for the client based on the resource consumption metric.

12. The consumption monitoring device of claim 11, wherein the resource consumption metric is a function of a power consumption metric (PCM), wherein processing resource executes the instructions to determine the power consumption metric (PCM) determined as:

$$PCM = \sum_{k=1}^{N1} \left( \sum_{t=1}^{T} (P_{consum_{k-t}} * Cost_{unitEn_{k-t}}) \right)$$

where, $P_{consum_{k-t}}$ is a power consumption in energy-hours for a networked resource k (k∈1, 2, . . . , N1) at time t, $Cost_{unitEn_{k-t}}$ is the per-unit cost of power for the networked resource k at the time t, N1 is a total number of networked resources subscribed by the client, and T is a consumption period.

13. The consumption monitoring device of claim 11, wherein the resource consumption metric is a function of a CPU consumption metric (CCM), wherein processing resource executes the instructions to determine the CPU consumption metric (CCM) as:

$$CCM = \sum_{k=1}^{N1}\left(\sum_{i=1}^{T}((CPU_{utilization_{k-t}} * F * N2 * Cost_{perCC_k} * \Delta t))\right)$$

where, $CPU_{utilization_k}$ is a CPU utilization for a networked resource k (k∈1, 2, . . . , N1) at time t, F is a base frequency, $Cost_{perCC_k}$ is a cost per clock cycle for the networked resource k, N2 is a total number of processing cores in the networked resource k, N1 is a total number of networked resources subscribed by the client, T is a consumption period, and Δt is a time deviation.

14. The consumption monitoring device of claim 11, wherein the resource consumption metric is a function of a memory consumption metric (MCM), wherein processing resource executes the instructions to determine the memory consumption metric (MCM) determined as:

$$MCM = \sum_{k=1}^{N1}\left(\sum_{i=1}^{T}(MBW_{used_{k-t}} * MBW_{max_k} * Cost_{unitMBW_{k-t}})\right)$$

where, $MBW_{used_{k-t}}$ is a memory bandwidth utilization for a networked resource k (k∈1, 2, . . . , N1) at time t, $MBW_{max_k}$ is a maximum available memory bandwidth for the networked resource k, $Cost_{unitMBW_{k-t}}$ is a cost per unit memory bandwidth for the networked resource k at time t, N1 is a total number of networked resources subscribed by the client, and T is a consumption period.

15. The consumption monitoring device of claim 11, wherein the resource consumption metric is a function of an IO consumption metric (IOCM), wherein processing resource executes the instructions to determine the IO consumption metric (IOCM) determined as:

$$IOCM = \sum_{k=1}^{N1}\left(\sum_{t=1}^{T}(IOBW_{used_{k-t}} * IOBW_{max_k} * Cost_{unitIOBW_{k-t}})\right)$$

where, $IOBW_{used_{k-t}}$ is an IO bandwidth utilization for a networked resource k (k∈1, 2, . . . , N1) at time t, $IOBW_{max_k}$ is a maximum available IO bandwidth for the networked resource k, $Cost_{unitIOBW_{k-t}}$ is a cost per unit IO bandwidth for the networked resource k at time t, N1 is a total number of networked resources subscribed by the client, and T is a consumption period.

16. A non-transitory machine-readable medium storing instructions executable by a processing resource, the instructions comprising:
    instructions to receive, at a consumption monitoring device, information regarding an OOB performance parameter from a manageability controller corresponding to a networked resource subscribed by a client, wherein the consumption monitoring device is communicatively coupled to the networked resource hosted on a cloud;
    instructions to determine, at the consumption monitoring device, a resource consumption metric corresponding to the networked resource for the client based at least on the information regarding the OOB performance parameter received from the manageability controller, wherein the resource consumption metric is a monetary amount calculated based at least on the OOB performance parameter be charged to the client for usage of the networked resource; and
    instructions to generate a billing report for the client based on the resource consumption metric.

17. The non-transitory machine-readable medium of claim 16, wherein the instructions to determine the resource consumption metric comprises instructions to determine a power consumption metric based on a power consumption corresponding to the networked resource and a per-unit cost of a power, wherein the power consumption is measured in energy-hours.

18. The non-transitory machine-readable medium of claim 16, wherein the instructions to determine the resource consumption metric comprises instructions to determine a CPU consumption metric based on a CPU utilization, a base frequency of a processing core, a number of cores, and a cost per clock cycle corresponding to the networked resource.

19. The non-transitory machine-readable medium of claim 16, wherein the instructions to determine the resource consumption metric comprises instructions to determine a memory consumption metric based on a memory bandwidth utilization, a maximum available memory bandwidth, and a cost per unit memory bandwidth corresponding to the networked resource.

20. The non-transitory machine-readable medium of claim 16, wherein the instructions to determine the resource consumption metric comprises instructions to determine an IO consumption metric based on an IO bandwidth utilization, a maximum available IO bandwidth, and a cost per unit IO bandwidth corresponding to the networked resource.

* * * * *